May 8, 1956     H. PAUL     2,744,813
CATALYTIC FURNACE

Filed Oct. 3, 1952     6 Sheets-Sheet 1

INVENTOR
Herbert Paul
By
Burgess Dinklage
attorneys

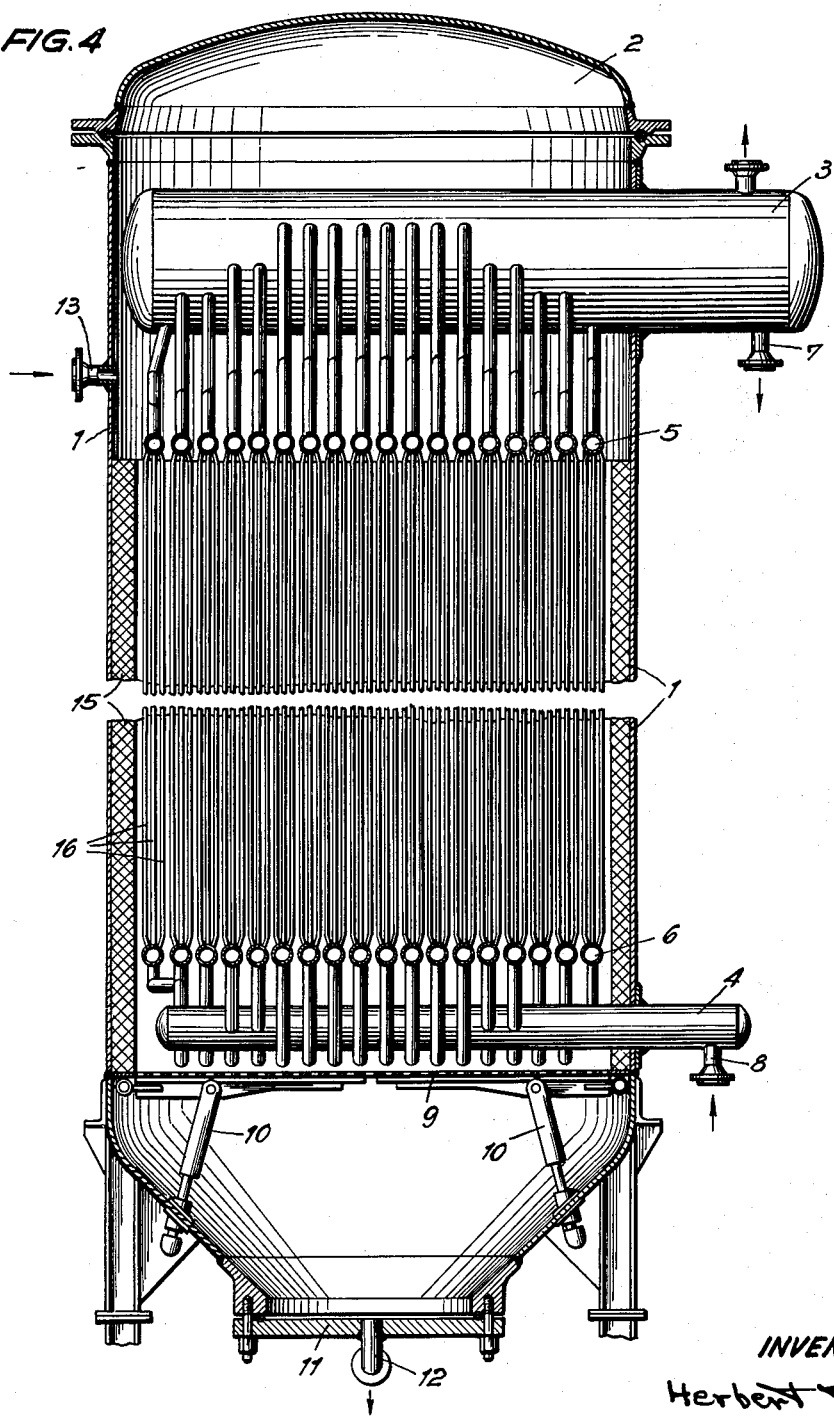

May 8, 1956 H. PAUL 2,744,813
CATALYTIC FURNACE
Filed Oct. 3, 1952 6 Sheets-Sheet 6

INVENTOR
Herbert Paul
By
Burgess + Dinklage
attorneys

United States Patent Office 2,744,813
Patented May 8, 1956

2,744,813

CATALYTIC FURNACE

Herbert Paul, Oberhausen-Holten, Germany, assignor to Ruhrchemie Aktiengesellschaft, Oberhausen-Holten, and Lurgi Gesellschaft fuer Waermetechnik m. b. H., Frankfurt am Main, Heddernheim, Germany, a corporation of Germany Application October 3, 1952, Serial No. 313,000

Claims priority, application Germany October 6, 1951

15 Claims. (Cl. 23—288)

This invention relates to a catalytic furnace. It more particularly relates to a catalytic furnace for carrying out catalytic reactions such as catalytic gas reactions.

Catalytic gas reactions are generally predominantly exothermic and large quantities of heat are often evolved. Some catalytic reactions are, however, endothermic in nature and it is necessary to supply heat during the course of the reaction. Reaction vessels have been developed for these types of exothermic and endothermic catalytic gas reactions, the design of which has taken into consideration the extensive heat and pressure problems encountered.

Thus, for example, for large scale catalytic hydrogenation of carbon monoxide for the production of hydrocarbons, which is a highly exothermic process, several types of furnaces have been designed and have come into use. Where the hydrogenation is effected at atmospheric pressure, a lamellar or ribbed heat-exchange furnace is generally used. The catalyst space of this furnace is transversed by a number of horizontal cooling tubes. Metal plates are vertically attached to these cooling tubes at fixed spacing and extend throughout the entire furnace. The catalyst is filled between these plates. For the catalytic carbon monoxide hydrogenation, which is effected at pressures of about 5-15 atmospheres, furnaces have been constructed in which the catalyst is positioned between two concentrically arranged tubes. A number of these double tube elements are positioned in a pressure water boiler in which boiling water flows around the tubes. Furnaces for catalytic carbon monoxide hydrogenation under pressure are also known, in which cooling tubes are arranged in vertical reactors and the catalyst mass is disposed between the tubes. The reaction heat is transferred through the tube walls to the liquid cooling agent, which in turn may be cooled outside of reaction space.

One object of this invention is a catalyst furnace for effecting catalytic gas reactions, such as catalytic carbon monoxide hydrogenation in which the reaction vessel may be pressure-resistant, and in which the cooling or heating system may be a completely integral tube system such as a completely welded tube system.

A further object of this invention is a catalyst furnace with a cooling or heating system which effects an extremely uniform cooling or heating of the catalyst. These, and still further objects, will become apparent from the following description read in conjunction with the drawings, in which:

Fig. 4 is a longitudinal section of another embodiment of a furnace in accordance with the invention.

Figure 1:
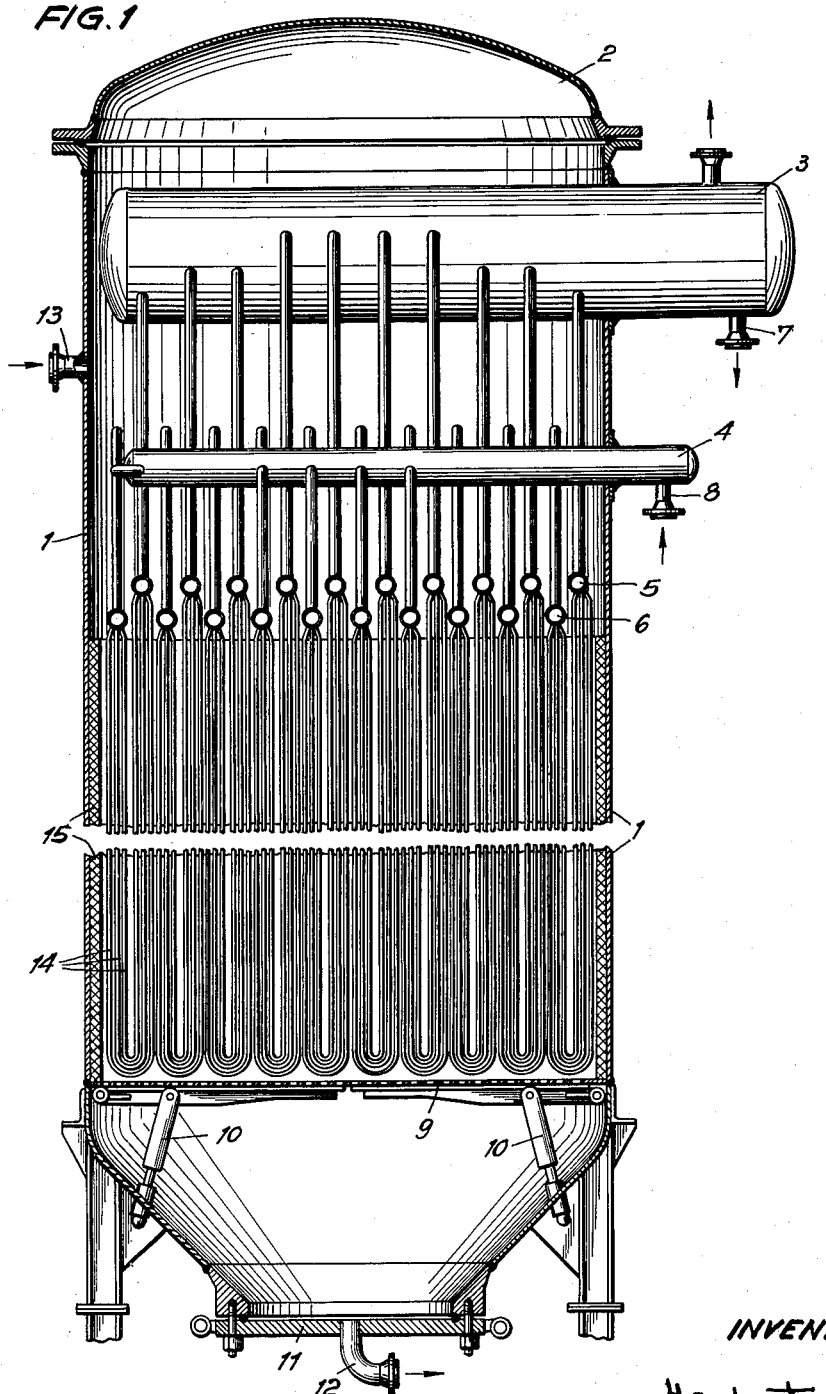
Fig. 1 is a longitudinal section of an embodiment of a catalyst furnace in accordance with the invention with hairpin shaped heat-exchange media tubes.

The catalyst furnace in accordance with the invention comprises a substantially enclosed reaction vessel which is preferably pressure-resistant. The vessel has a fluid inlet and a fluid outlet for the reaction fluid such as the reaction gases. The fluid inlets and the fluid outlets are generally positioned at opposite end portions of the reaction vessel so that the reaction gases may pass therethrough. A multiple number of substantially parallel tube outlet collecting pipes are transversely distributed over a cross-section of the vessel. A multiple number of parallel tube inlet pipes are similarly positioned generally in a different horizontal plane. The two groups of collecting pipes may be substantially at the same end portion of the reaction vessel or may be at opposite end portions. A number of parallel heat-exchange media tube bundles extend through a portion of the reaction vessel in a longitudinal direction and are distributed over the cross-section of the portion through which they extend. Each of the tube bundles is connected at one end to a tube-outlet collecting pipe and at the other end to a tube-inlet collecting pipe. Each of the tube bundles consists of a number, and preferably three, of substantially equally spaced parallel tubes. When three tubes are used, they are triangularly positioned to form an equilateral triangle. When both groups of collecting pipes are positioned at substantially the same end portion of the reaction vessel, the tube bundles and the individual tubes therein are hair-pin shaped with a U-bend. The U-bends of the tubes in each bundle are generally positioned one inside the other. When the collecting pipes are positioned at opposite end portions of the reaction vessel, the tube bundles and the tubes are generally straight, extending longitudinally through the reaction vessel. The tubes and tube bundles are preferably so positioned that from the center of the interspaces between the tubes for the catalyst, the tubes are equidistant and have the same cooling surface.

At least one intermediate collector container is positioned in the reaction vessel and has a heat-exchange media inlet for heat-exchange media from outside of the reaction vessel. Conduit means connect this intermediate collector container to the tube inlet collecting pipes. A main collector container is also positioned in the reaction vessel and has a heat-exchange media outlet positioned for the passage of heat-exchange media out of the reaction vessel. Conduit means connect this container to the tube outlet collecting pipes. Means such as a pump and/or a conduit may be provided for passing heat-exchange media from the heat-exchange media outlet to the inlet.

The tubes of the tube bundles may be integrally connected to the collecting pipes as by being welded thereto. All the connections in the cooling system may be integral connections, as, for example, by welding.

The new furnace in accordance with the invention allows a temperature control to be maintained within the most narrow limits and a uniform temperature level to be maintained in all parts of the furnace. In addition, the particular arrangement of the tube system allows an excellent control of the high pressures of the heating or cooling media which may be considerably higher than the gas pressure in the catalyst space surrounding the tube system.

For technical and industrial reasons, water is generally used as the cooling media. Boiling water, due to its high-heat vaporization offers as a cooling agent the greatest certainty for the removal of the considerable reaction heat produced in many catalytic gas reactions. In addition, boiling water enables the reaction heat removed to be converted into useful steam in the simplest manner. When water is used as a cooling media the main collector container may be provided with a conduit for the removal of the steam.

In operation, the heat-exchange media is passed into the inlet of the intermediate collector, passes into the tube inlet collector pipes through the tubes of the heat-exchange media tube bundles into the tube-outlet collecting pipes to the main collector container and out of the main collector container. When the tubes are hair-pin shaped, the heat-exchange media passes through one arm of the tubes around the U-bend and then through the other arm of the tubes. The heat-exchange media may be circulated by pump means or the like from the media outlet to the media inlet, and, if water is used as the cooling media, steam may be withdrawn from the main collector container.

By use of a pump any rate of circulation of the cooling or heating media may be adjusted to correspond to the particular requirements. At the same time it is possible to choose the direction of circulation of the media through the tubes. By means of a suitable reversing device in connection with the pump, the direction of the circulation of the media within the catalyst furnace may be changed. The heat or cold removed from the reaction space itself is not available for other purposes, such as, for the cooling or preheating of gases as working medium, or for the generation of steam.

If the two groups of collecting pipes are positioned at substantially opposite end portions of the reaction vessel, such as with the tube-inlet collecting pipes at the bottom or tube-outlet collecting pipes at the top with the tube bundles running longitudinally straight through the reaction vessel, the circulation of the heat-exchange media may in addition to being pump-circulated, be circulated by thermo-syphon action. In this embodiment both the tube-inlet collecting pipes and the intermediate collector container are positioned below the catalyst space.

The integral, such as welded connection, between the tubes of the heat-exchange media tube bundles is most practically so effected when using the hair-pin shaped tube bundles so as to provide the collecting pipes with connections which are spaced as close as possible and to which the tubes are welded. Thus the same space is available everywhere for the catalyst mass and the spacing between the two cooling tubes remains the same at any point. As mentioned, preferably three triangularly disposed equidistant tubes are used in each tube bundle and are so connected to the collecting pipes.

Referring to the drawings, the furnace shown in Fig. 1 consists of a pressure-resistant cylindrical reaction vessel 1 having a conically tapering bottom and removable dome-shaped or vault cover 2. A main collector container 3 is positioned within the cylindrical shell of the reaction vessel and extends through the wall of the vessel on one side. Below the main collector container two parallel intermediate collector containers 4 of smaller diameter are positioned in the same manner as the main collector container and extend at one end through the wall of the cylindrical shell of the reaction vessel. Below the two intermediate collector containers 4, two rows of collecting pipes are positioned, an upper row of tube-outlet collecting pipes 5 and a lower row of tube-inlet collecting pipes 6. The pipes in each row are parallel and positioned transverse to the axis of the container. The pipes will thus be referred to as transversely distributed over a cross-section of the reaction vessel. The upper row 5 of the tube-outlet collecting pipes is directly connected by conduits to the main collector container. Conduits directly connect the lower row of tube-inlet collecting pipes to the two intermediate collector containers 4.

Heat-exchange media tube bundles extend through the catalyst space of the reaction vessel. These bundles consist of tubes connected at one end to a tube-outlet collecting pipe 5 and at the other end to a tube-inlet collecting pipe 6. As shown, the bundles are hair-pin shaped with U-bends. Each bundle consists in this case of three parallel tubes, triangularly positioned with respect to each other and equally spaced to form an equilateral triangle. The U-bends at the bottom of each tube in each bundle are positioned one within the other. Heat-exchange media from the tube-inlet collecting pipes 6 are passed downward through the legs of each of the tubes, passed around the U-bend and upward through the other legs of the tubes into the tube-outlet collecting pipes 5. Heat-exchange media is withdrawn from the main collector container 3 through the heat-exchange media outlet 7, which consists of a suction nozzle. The media is withdrawn by a pump which discharges into the media inlet 8 which consists of a pipe connection, into the two intermediate collector containers 4, from which the heat-exchange media is conducted to the lower row of collecting pipes 6. From the collecting pipes 6 it again enters the hair-pin shaped tubes 14, and after passage through these tubes, passes to the upper row of collecting pipes 5. From the collecting pipes 5 it is again passed to the main collector container 3. Steam under pressure may be withdrawn from the main collector container 3 if water is used as the cooling agent.

The removal or supply of heat required for the control of the reaction may also be effected by means of a heat-exchanger which is connected to the intake or discharge line of the circulating pump. The heat exchanger may be utilized for the production of cold or heat as required.

The hair-pin shaped tubes of each tube bundle are triangularly positioned, so that they form an equilateral triangle when three tubes in one bundle are used, and the bundles are equally spaced from each other so that the entire cross-section of the reaction vessel is substantially uniformly filled with tubes and the distance from the center of the interspaces between the tubes to each tube is the same and therefore has the same cooling surface. The catalyst is positioned in these interspaces.

Just below the tube bundles hinged sieves 9 are arranged which support the catalyst mass. These sieves may be operated by a lever 10 from outside of the reactor. Below the conically narrowing bottom, a removable bottom 11 is attached which has in its center the fluid outlet which consists of a pipe 12 and through which the reaction gases, etc. are removed from the reaction vessel. The reaction gases are passed into the reaction vessel through the fluid inlet consisting of the pipe connection 13.

Figure 2A:
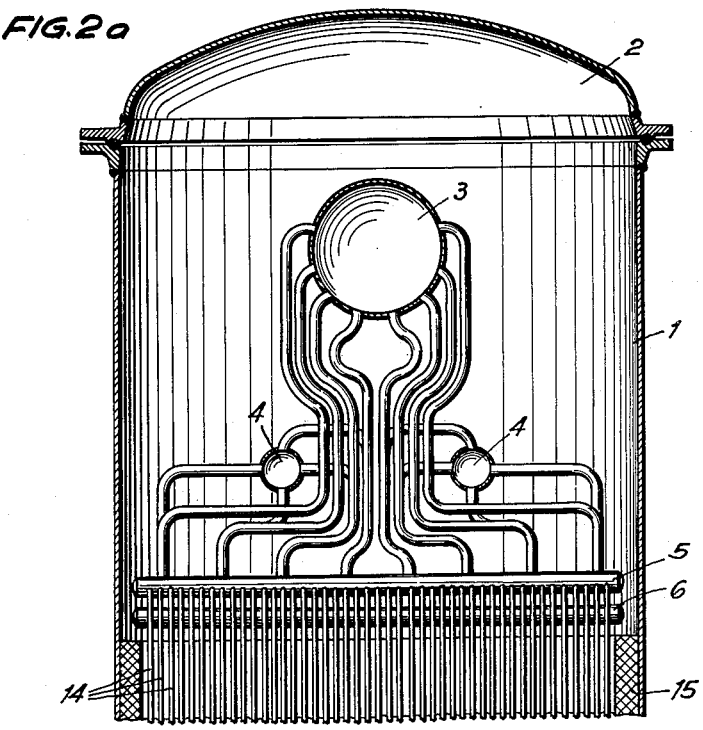
Fig. 2a is a longitudinal section of the upper portion of the furnace shown in Fig. 1 in a plane 90° to the plane of the section of Fig. 1.
Figure 2B:
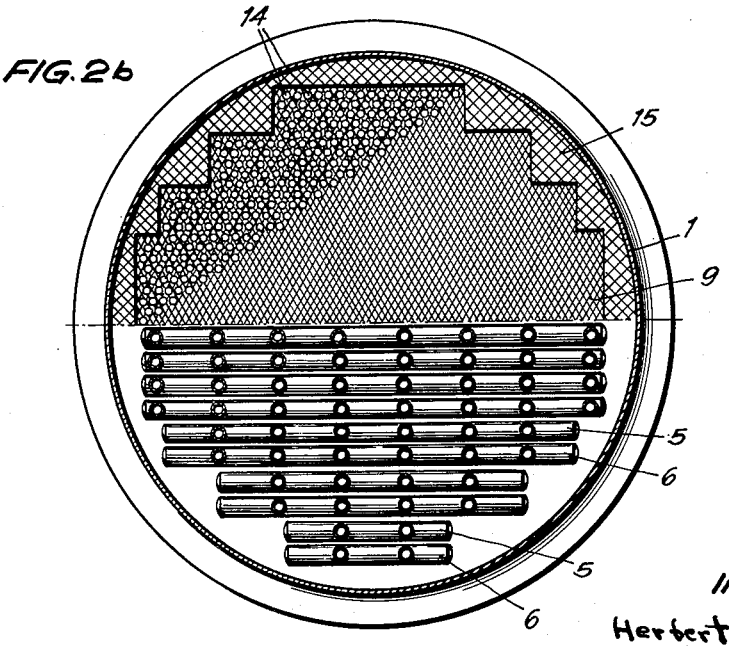
Fig. 2b is a cross-section of the furnace shown in Fig. 1, the upper half of the cross-section being below the collecting pipes and the lower half of the cross-section being above the collecting pipes.

Fig. 2a shows a longitudinal section of the upper portion of the furnace shown in Fig. 1 through a plane 90° to a plane in Fig. 1. In Fig. 2b, which is a cross-section, the upper half is through the half of the furnace below the collecting pipes 6 and the lower half is a cross-section through the furnace above the collecting pipes 5. Opposite ends of the hair-pin shaped tubes are connected to adjacent collecting pipes 5 and 6. Several tube bundles consisting of the hair-pin shaped tubes are connected one next to the other on each two adjacent collecting pipes 5 and 6, depending upon the space available. In the same manner, the conduits connecting the main collector container 3 with the two outlet-collecting pipes 5, are always arranged in pairs.

As may clearly be seen from the upper half of the cross-section shown in Fig. 2b, the tubes are so arranged that substantially the same space for the catalyst mass is available between them practically everywhere. This assures a uniform removal or supply of the heat for the reaction. Between the outer tubes and the furnace shell an insulating layer 15 is provided, which prevents the catalyst mass from settling between the furnace shell and the outer tubes while simultaneously maintaining the distance of the cooling surface.

Figure 3A:
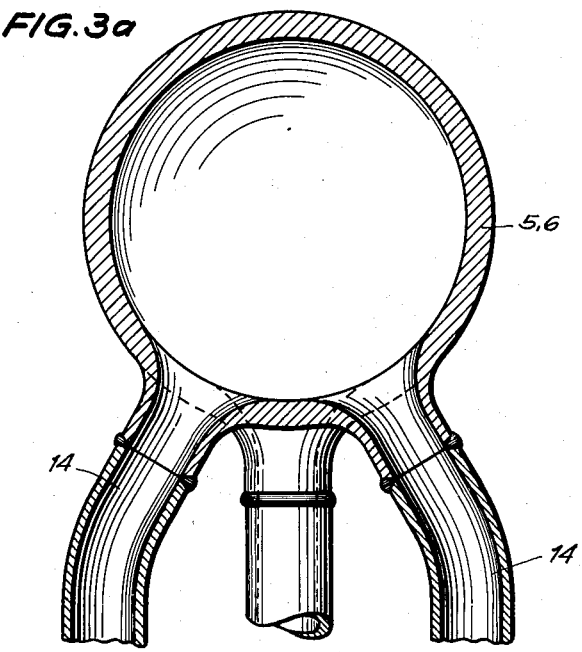
Fig. 3a shows a cross-section of a collecting pipe according to the invention with the tubes welded thereto.
Figure 3B:
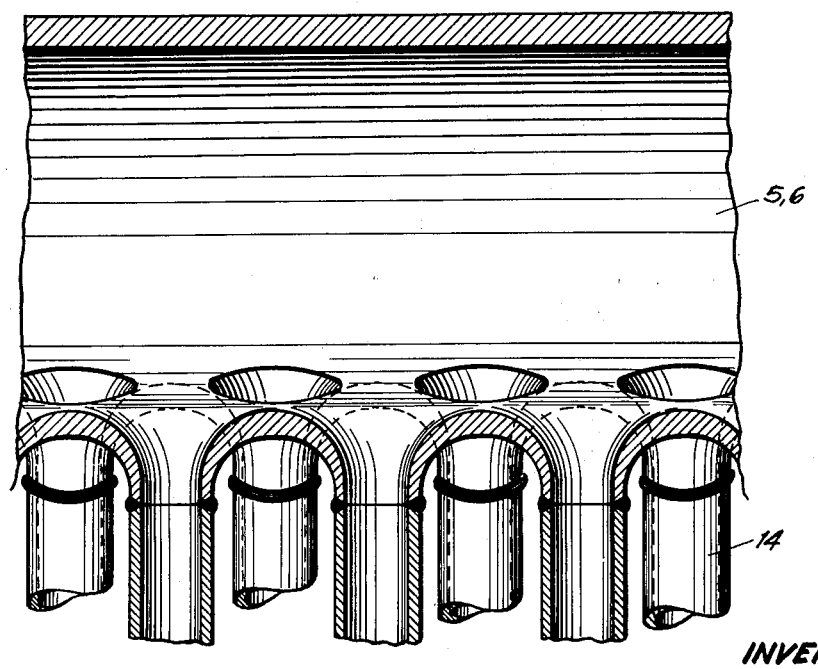
Fig. 3b shows a longitudinal section of a collecting pipe with the tubes welded thereto.
Figure 3C:
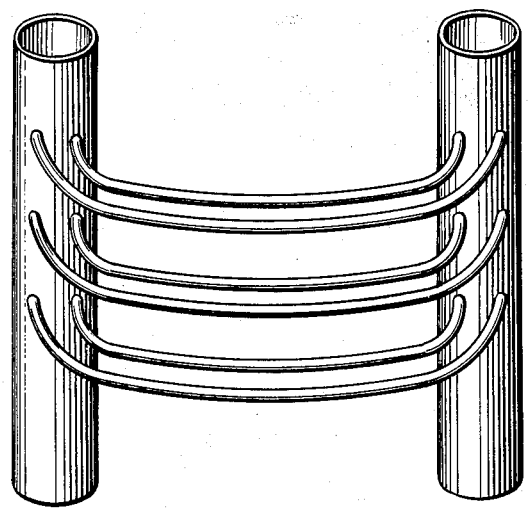
Fig. 3c shows a bottom view of two collecting pipes with a different arrangement of the tubes welded thereto.

The joining of the tubes 14 forming the tube bundles to the collecting pipes 5 or 6 may clearly be seen from Figs. 3a and 3b, which show cross and longitudinal sections of the pipes and the connection portions of the tubes. The tubes, as may be seen, are integrally connected by welding and are disposed in the form of an equilateral triangle. Fig. 3c shows a different arrangement of tubes with only two tubes forming a bundle.

Figure 5:
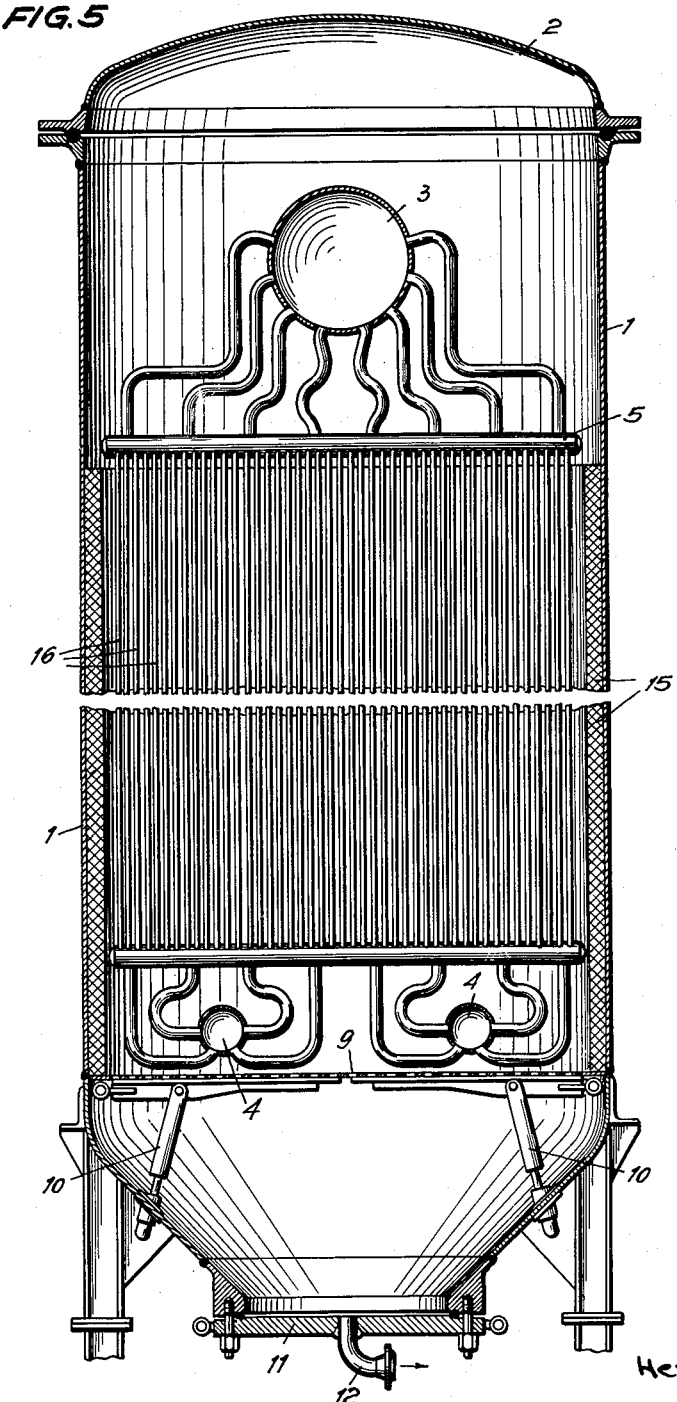
Fig. 5 is a longitudinal section of the furnace shown in Fig. 4 in a plane 90° to the plane of the section of Fig. 4.

In Figs. 4 and 5 the embodiment of the furnace in accordance with the invention is shown in which the heat-exchange media tubes are straight and not hair-pin shaped. In this embodiment all parts are identical except that the row of tube-inlet collecting pipes 6 and the intermediate collector containers 4 are positioned below the catalyst space at the lower portion of the reaction vessel. In this embodiment the recirculation of the heat-exchange media may be effected without the use of the pump and by natural recirculation, i. e., thermo-syphon action.

With natural recirculation, as may be effected with this embodiment, the reflux is effected from the outlet 7 to the inlet 8 if heat is to be removed, i. e., in an exothermic reaction. Reflux is effected in the reverse direction if heat is to be supplied as in the case of an endothermic reaction. In the case of an exothermic reaction, when using water as the heat-exchange media, steam may be withdrawn by expansion in the collector container 3. In addition, the necessary quantity of heat may be removed by connecting a heat exchanger to the connection between the inlet and outlet 7 and 8. A heat exchanger may similarly be used for the production of cold or heat.

With reference to the embodiment in which each tube bundle consists of three hair-pin shaped tubes spaced apart in the form of an equilateral triangle when it is stated that the U-bends of the tubes are positioned one within the other, there is specifically meant thereby that two of the tubes are substantially in a common plane, one concentrically positioned within the other. The third tube is in a different plane, but if projected on the plane common to the other two tubes, would appear between these two in the manner shown in Fig. 1.

I claim:

1. A catalyst furnace comprising a substantially enclosed reaction vessel having a fluid inlet and fluid outlet, a multiple number of substantially parallel tube-outlet collecting pipes substantially transversely distributed over a cross-section of said reaction vessel, a multiple number of substantially parallel tube-inlet collecting pipes substantially transversely distributed over the cross-section of said reaction vessel, a multiple number of parallel heat-exchange media tube bundles extending longitudinally through a portion of said reaction vessel and distributed over the cross-section of said portion, each said tube bundle being connected at one end to a tube-outlet collecting pipe and at the other end to a tube-inlet collecting pipe, each said tube bundle comprising a number of substantially equally spaced parallel tubes, at least one intermediate collector container of substantially greater cross-section than said tube-inlet and tube-outlet collecting pipes positioned in said reaction vessel and having a heat-exchange media inlet for heat-exchange media from outside said reaction vessel, conduit means connecting said tube-inlet collecting pipes to said intermediate collector container, a main collector container of substantially greater cross-section than said tube-inlet and tube-outlet collecting pipes positioned in said reaction vessel and having a heat-exchange media outlet positioned for the passage media out of said reaction vessel, and conduit means connecting said tube-outlet collecting pipes to said main collector container.

2. A catalyst furnace according to claim 1, in which said reaction vessel is a pressure-resistant reaction vessel.

3. A catalyst furnace according to claim 1, in which said tubes are integrally connected to said collecting pipes.

4. A catalyst furnace according to claim 1, in which said tube-outlet collecting pipes and said tube-inlet collecting pipes are positioned in substantially the same portion of said vessel and in which said heat-exchange media tube bundles extend downwardly from said tube-inlet collecting pipes to a U-bend, and thereafter extend upwardly to said tube-outlet collecting pipes.

5. Catalyst furnace according to claim 4, in which each said tube bundle consists of a number of, e. g. three, substantially parallel tubes containing U-bends equally spaced apart.

6. Catalyst furnace according to claim 5, in which the U-bends of the tubes of each bundle are positioned one within the other.

7. Catalyst furnace according to claim 6, in which said tube bundles are so positioned that the space between any tube is equidistant from the center thereof to the adjacent tubes.

8. Catalyst furnace according to claim 7, including pump means positioned for passing heat-exchange media from said media outlet to said media inlet.

9. Catalyst furnace according to claim 1, in which said tube-outlet collecting pipes and said main collector container are positioned in one end portion of said reaction vessel and said tube-inlet collecting pipes and said intermediate collector container are positioned at the other end portion of said reaction vessel, said tubes being substantially straight tubes.

10. Catalyst furnace according to claim 9, including conduit means connecting said heat-exchange media outlet to said heat-exchange media inlet.

11. Catalyst furnace according to claim 1, in which each said tube bundle consists of three equally spaced tubes forming a substantially equilateral triangle.

12. Catalyst furnace according to claim 11, in which said tube bundles are so positioned that the interspaces between any of the tubes is equidistant from the center thereof to the adjacent tubes.

13. Catalyst furnace according to claim 12, in which said tube bundles are positioned so that the spaces defined between the tubes are substantially equal.

14. Catalyst furnace according to claim 1, including means for passing heat-exchange media from said heat-exchange media outlet to said heat-exchange media inlet.

15. Catalyst furnace according to claim 1, in which said main collector container has a steam-removal conduit.

References Cited in the file of this patent

UNITED STATES PATENTS

| | | |
|---|---|---|
| 1,842,235 | Barnes | Jan. 19, 1932 |
| 2,518,270 | Barr | Aug. 8, 1950 |
| 2,552,505 | Patterson | May 8, 1951 |
| 2,620,262 | Hujsak et al. | Dec. 2, 1952 |